Nov. 24, 1936.  C. L. THOMSEN  2,062,239
POULTRY FEEDING AND WATERING DEVICE
Filed June 20, 1935   2 Sheets-Sheet 1
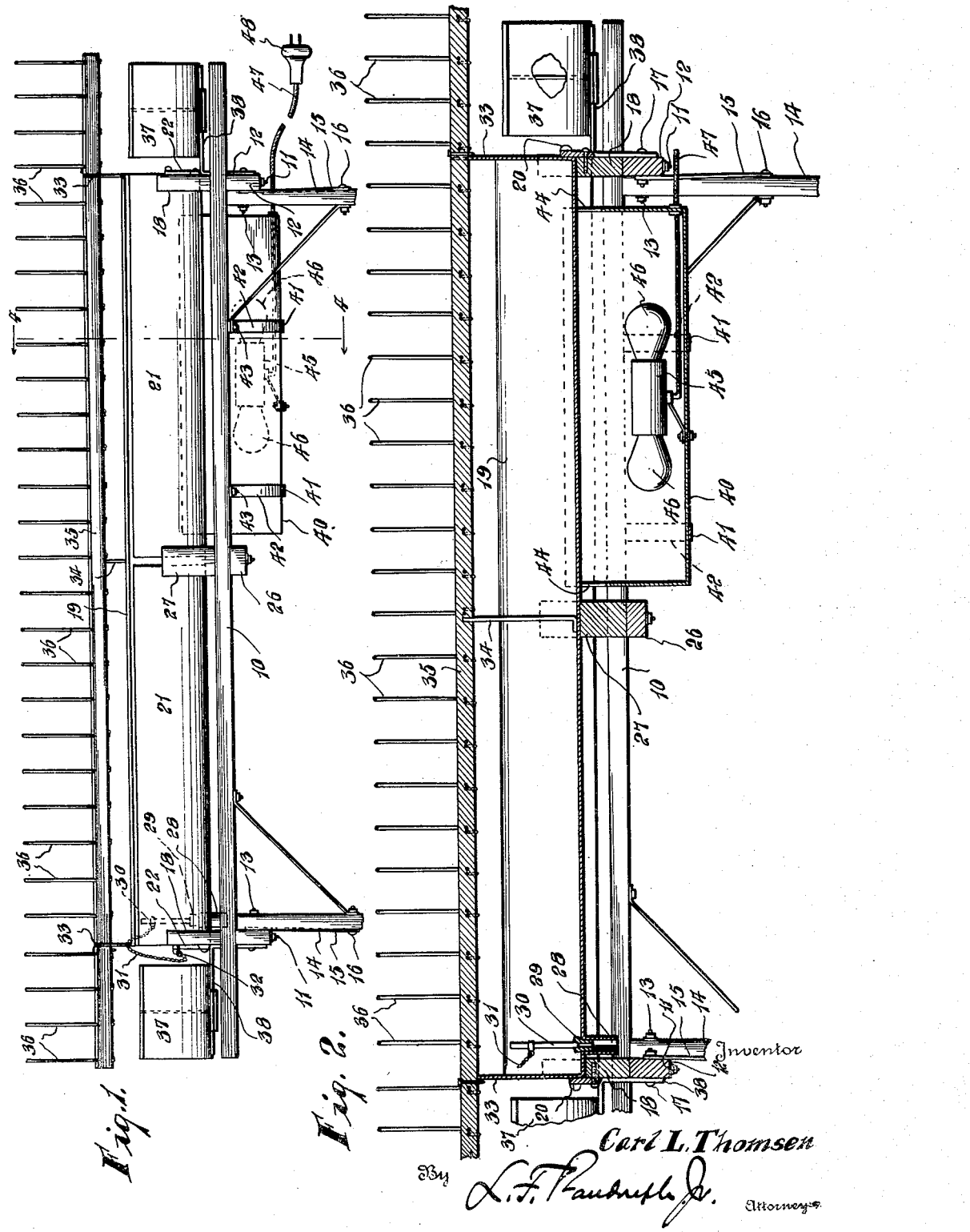

Nov. 24, 1936.　　　　　C. L. THOMSEN　　　　　2,062,239
POULTRY FEEDING AND WATERING DEVICE
Filed June 20, 1935　　　　　2 Sheets-Sheet 2

Inventor
Carl L. Thomsen

Attorney

Patented Nov. 24, 1936

2,062,239

UNITED STATES PATENT OFFICE 2,062,239

POULTRY FEEDING AND WATERING DEVICE

Carl L. Thomsen, Milwaukee, Wis.

Application June 20, 1935, Serial No. 27,581

2 Claims. (Cl. 119—51)

This invention relates to a poultry watering and feeding device.

It is generally aimed to provide an improved, relatively simple and compact construction which will supply all of the materials necessary to the feeding of poultry or the like, particularly water, feed, grit, and oyster shell.

It is further aimed to provide such a construction wherein the water may be heated, wherein guard means are employed to prevent the poultry from perching on the troughs and befouling their contents and a construction wherein the troughs have a curved wall particularly guarding against waste.

The more specific objects and advantages will become apparent from a consideration of the description following taken in connection with accompanying drawings illustrating an operative embodiment.

In said drawings:—

Figure 1 is a side elevation of the device;

Figure 2 is a fragmentary central longitudinal sectional view taken on the line 2—2 of Figure 4;

Figure 3:
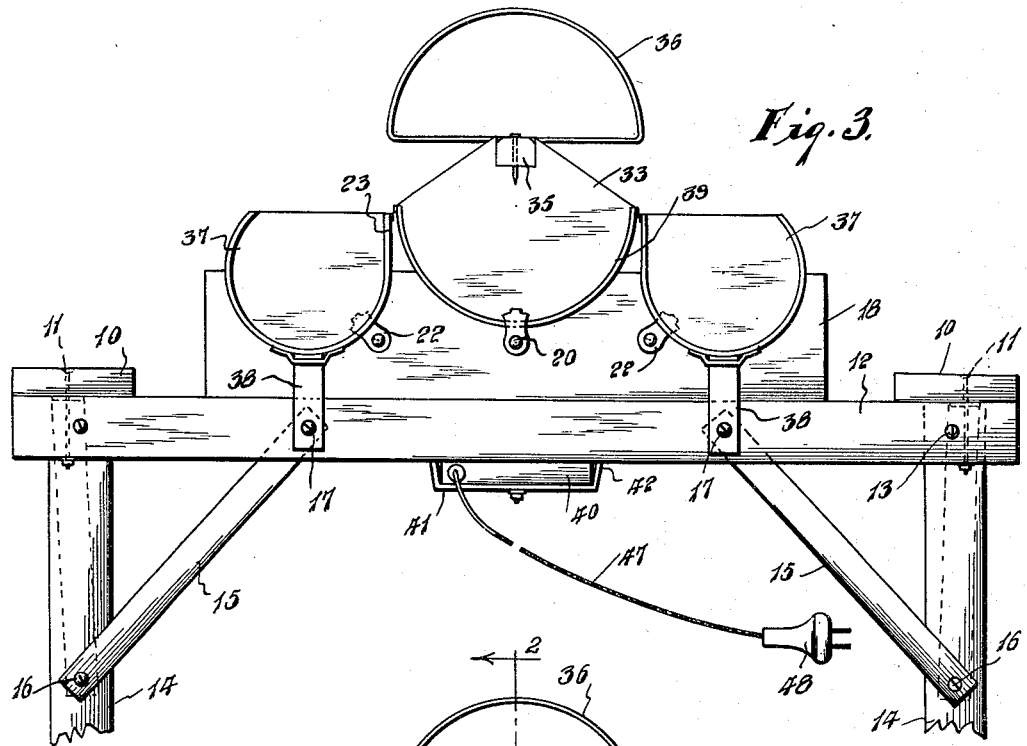
Figure 3 is an end elevation.
Figure 4:
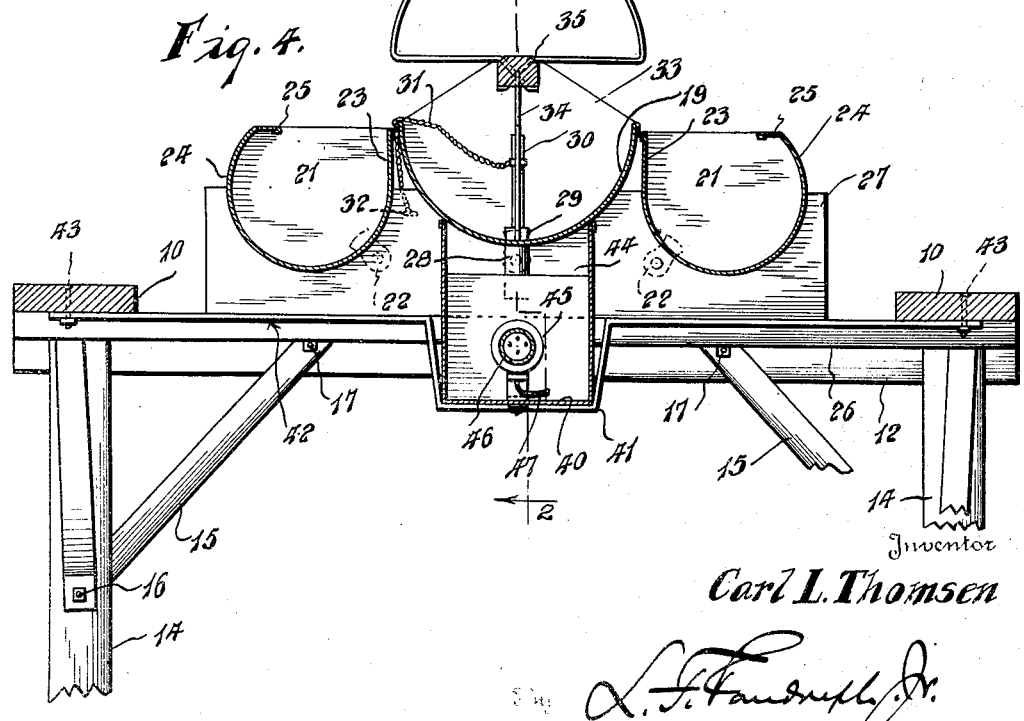
Figure 4 is a transverse sectional view taken on the line 4—4 of Figure 1.

In said drawings, wherein like reference characters designate like or similar parts, 10 designates two longitudinally extending perches fastened by bolts 11 or otherwise to transverse bars 12, in turn bolted as at 13 to supporting legs 14. Suitable braces 15 are bolted or otherwise fastened as at 16 and 17 to the legs 14 and cross bars 12.

Fastened to and over the cross bars are cradles 18 cut away so that a water trough 19 rests therein, fastened against longitudinal movement by suitable pivoted latches or buttons at 20 carried by the cradles. On each side of the water trough, is a feed trough 21 also resting in cut away portions in the cradles and fastened against longitudinal movement by means of pivoted latches 22 carried by the cradles. It will be noted that the inner walls 23 of the troughs 21 are preferably vertical while the outer upper wall portions 24 curve inwardly and terminate in inwardly extending flanges 25, which I find materially minimizes waste, since the birds are unable to throw the feed with their bills out of the trough, when the kind is not to their liking. The perches 10 may also have a cross bar 26 bolted thereto with a cradle 27 thereover, of identical form as those shown at 18. Obviously the troughs 19 and 21 may be of any cross sectional shape desired.

The trough 19 may be drained when desired, to which end it has a drain pipe 28 depending therefrom, normally closed by a suitable plug 29, for instance of rubber, carried by a stem 30, to which a chain 31 is fastened and which in turn is stapled as at 32 to one of the cradles. The plug 29 may be readily removed and applied with respect to the drain pipe 28, and when loose will not be lost since it is tethered by the chain 31.

The end walls 33 and an intermediate supporting rod or bracket 34 extend above the water trough 19 and centrally support a longitudinally extending bar 35 along which a plurality of equidistantly spaced guards 36 are provided. Said guards 36 are preferably removable and each made from a single strand of wire bent into substantially semicircular form. Said guards 36 prevent the fowls from perching on the sides of trough 19 and befouling the water and feed and other material in the respective troughs.

It will be noted that the bar 35 and guard extend a distance beyond both ends of the troughs 19 and 21 and that they are of the same length as the perches 10. At the opposite ends of troughs 21 and alined therewith other troughs 37 are disposed which may be used to contain grit and ground oyster shells or the like, such troughs or receptacles 37 being mounted by means of L-shaped brackets 38 fastened as at 17 to the cross bars 12.

If desired, the water in the trough 19 may be somewhat heated or maintained at a temperature to prevent freezing, and to this end a casing or chamber 40 is held against the lower surface of the trough 19, being supported in depressions 41 of metallic straps or brackets 42 bolted as at 43 to the perches. Vent openings 44 are provided in the end walls of the casing 40 and a double end electric socket 45 is suitably mounted in said casing to removably accommodate electric lamps or bulbs 46, one at each end, electric current being adapted to be supplied from any suitable source to the sockets 45, for instance through conductors 47 having a plug 48 adapted to be connected in any suitable socket. Obviously, any other heater may be substituted for the lamps 46.

Various changes may be resorted to provided they fall within the spirit and scope of the invention.

What is claimed is:—

1. A device of the class described having a watering trough, walls of said trough being upwardly extended, a bar supported by said upwardly extended walls, guard means carried by said bar, said bar extending beyond the end of the trough, cradles removably mounting said trough, feed troughs mounted by the cradles on opposite sides of the watering trough, the feed troughs having their outer longitudinal walls curved upwardly and inwardly, cross bars supporting said cradles, brackets connected to the cross bars, and receptacles mounted by the brackets beyond the ends of said feed troughs, said receptacles being removable to provide clearance for the removal of said feed troughs.

2. A device of the class described having a watering trough, walls of said trough being upwardly extended, a bar supported by said upwardly extended walls, guard means carried by said bar, said bar extending beyond the end of the trough, cradles mounting said trough, feed troughs mounted by the cradles on opposite sides of the watering trough, the feed troughs having their outer longitudinal walls curved upwardly and inwardly, cross bars supporting said cradles, brackets secured to the cross bars, receptacles mounted by the brackets beyond the ends of said feed troughs, a chamber member open at the top removably engaging the outer surface of the watering trough and disposed between and relatively close to two of said cradles, heating means for said chamber, perches mounted on opposite sides of the collective troughs, and straps secured to the perches having depressed portions removably mounting said heating chamber.

CARL L. THOMSEN.